US006935103B2

(12) United States Patent

Binder et al.

(10) Patent No.: US 6,935,103 B2
(45) Date of Patent: Aug. 30, 2005

(54) DEVICE FOR EXHAUST-GAS PURIFICATION, AND AN OPERATING AND MONITORING FOR SAID DEVICE

(75) Inventors: Klaus Binder, Deizisau (DE); Peter Ebel, Braunsbach (DE); Gerhard Fraenkle, Remshalden-Grunbach (DE); Alexander Funk, Altbach (DE); Klaus-Juergen Marquardt, Remshalden (DE); Ansgar Schaefer, Ehningen (DE); Georg Huthwohl, Soest (DE); Bernd Maurer, Balve (DE)

(73) Assignees: DaimlerChrysler AG, Stuttgart (DE); PURem Abgassysteme GmbH & Co. KG, Menden (DE)

( * ) Notice: Subject to any disclaimer, the term of this patent is extended or adjusted under 35 U.S.C. 154(b) by 0 days.

(21) Appl. No.: 10/372,659

(22) Filed: Feb. 25, 2003

(65) Prior Publication Data

US 2004/0031263 A1 Feb. 19, 2004

(30) Foreign Application Priority Data

Feb. 25, 2002 (DE) ........................................ 102 07 984

(51) Int. Cl.[7] .................................................. F01N 3/00

(52) U.S. Cl. ............................ 60/286; 60/274; 60/295; 60/301; 60/303

(58) Field of Search .......................... 60/274, 286, 295, 60/301, 303

(56) References Cited

U.S. PATENT DOCUMENTS 4,403,473 A * 9/1983 Gladden ...................... 60/274
5,367,875 A * 11/1994 Aboujaoude et al. ......... 60/303
5,540,047 A * 7/1996 Dahlheim et al. ............ 60/274
5,628,186 A * 5/1997 Schmelz ...................... 60/274
5,809,775 A * 9/1998 Tarabulski et al. ............ 60/274
5,884,475 A * 3/1999 Hofmann et al. ............. 60/274
6,063,350 A * 5/2000 Tarabulski et al. ....... 423/239.1
6,209,315 B1 * 4/2001 Weigl .......................... 60/274
6,273,120 B1 * 8/2001 Hofmann et al. ............. 137/98
6,301,879 B1 * 10/2001 Weisweiler et al. ........... 60/274
6,387,336 B2 * 5/2002 Marko et al. ............... 423/212
2002/0134074 A1 * 9/2002 Huthwohl et al. ............ 60/286

FOREIGN PATENT DOCUMENTS

DE 29708591 8/1997

* cited by examiner

*Primary Examiner*—Thomas Denion
*Assistant Examiner*—Diem Tran
(74) *Attorney, Agent, or Firm*—Crowell & Moring LLP

(57) ABSTRACT

A device for exhaust-gas purification utilizes reduction of nitrogen oxides which are present in the exhaust gas from internal combustion engines by way of gaseous ammonia with an SCR catalytic converter. The functions of the device are monitored with regard to their line paths with connections, valves and sensors by referring to these elements themselves using suitable control circuitry via the evaluation and control unit.

43 Claims, 1 Drawing Sheet

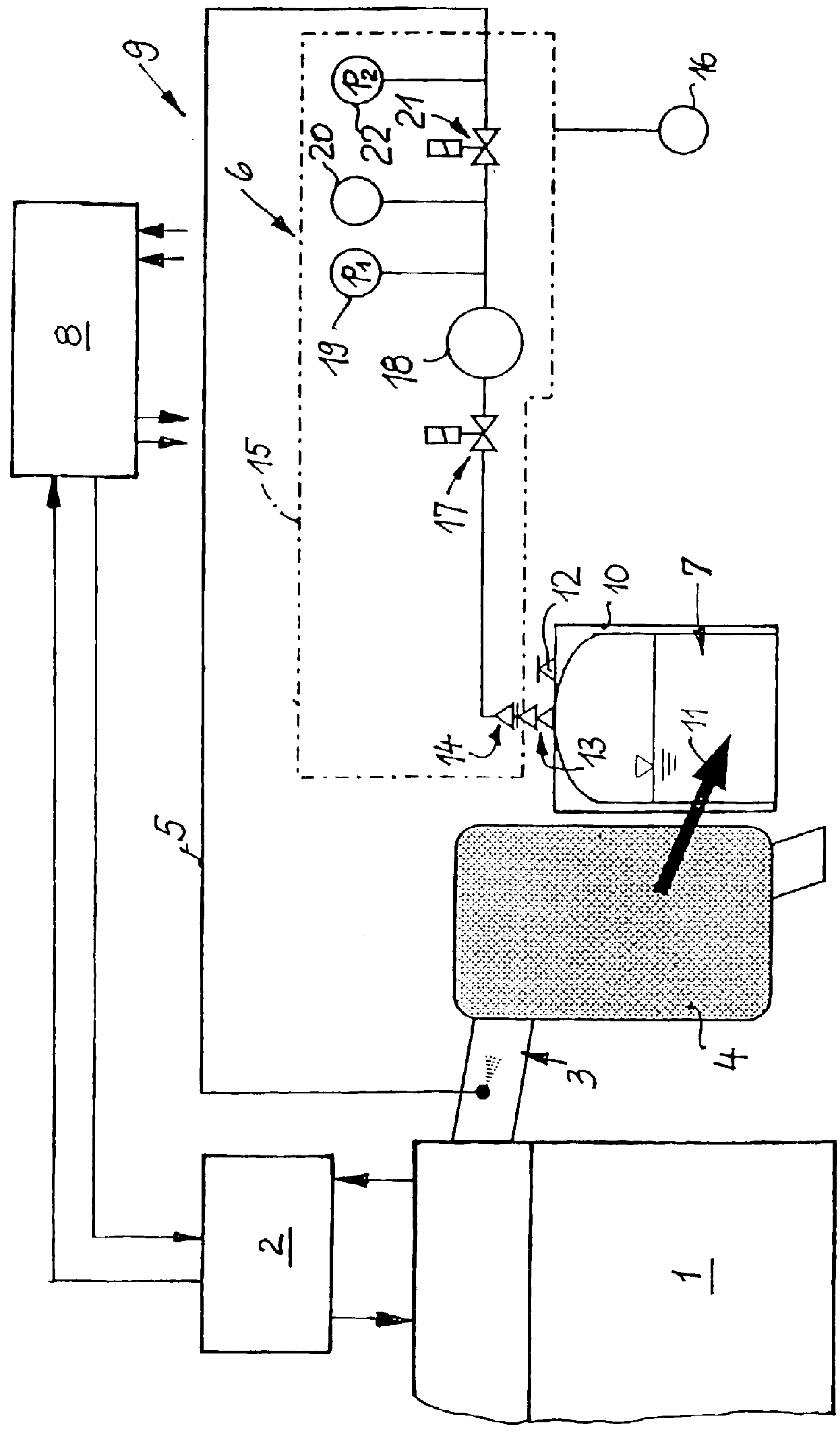
1
2
3
4
5
6
7
8
9
10
11
12
13
14
15
16
17
18
19
20
21
22
P1
P2

DEVICE FOR EXHAUST-GAS PURIFICATION, AND AN OPERATING AND MONITORING FOR SAID DEVICE

BACKGROUND OF THE INVENTION

The present invention relates to a device for exhaust-gas purification involving reduction of nitrogen oxides, which are present in the exhaust gas from internal combustion engines, in particular for motor vehicles, by way of ammonia in an SCR catalytic converter, and to a method for operating and monitoring a device of this type.

Devices which operate with SCR catalytic converters (Selective Catalytic Reduction catalytic converters), are disclosed, for example, in DE 297 08 591 U1. Particularly when used in motor vehicles, devices of this type have to satisfy particular demands with regard to the space taken up, the ability for spontaneous response and the ability to adapt to constantly changing working conditions, as well as operational safety.

In connection with operation safety, substances or substance mixtures which release ammonia through thermolysis are used as the ammonia source, which has the effect of requiring an increased amount of space, because the ammonia which can be used for the reduction constitutes only a fraction of the starting material. Moreover, spontaneous response requires a sufficiently large reservoir or temporary store volume for the ammonia which has been released in gas form. All this is associated with corresponding safety requirements.

SUMMARY OF THE INVENTION

An object of the present invention is to form a device such that, with a minimum demand for space, a spontaneous ability to respond and the required operational safety are provided.

This has been achieved by a pressure vessel, which has a filling which releases ammonia in gas form when heat is supplied and downstream of which in the transition to the catalytic converter, there is a metering unit is provided as ammonia source, wherein the pressure vessel has, as its filling is liquid ammonia, and in that at least the metering unit is arranged in a gastight, pressure-monitored housing. Accordingly, the ammonia is stored in liquefied form in the pressure vessel and the metering unit for the ammonia which has been converted into gas form is arranged in a substantially gastight, pressure-monitored housing. Thereby, with a high useful volume of the device, controlled metering is possible, combined, at the same time, with monitoring of operation for operational safety. In this way, it is also now possible, in particular, to produce separate safety features for the pressure vessel, on one hand, and the further connections, as is expedient with a view to the pressure vessel being designed as an exchangeable pressure cylinder. Moreover, it is, in a simple way, possible to assign the pressure vessel a heat exchanger for heating purposes and for this heat exchanger, if appropriate, to be configured as an insulating and/or pressure-resistant holding vessel, so that the holding vessel can in effect make the pressure vessel into a double-walled design.

In conjunction with a configuration of this type, when the heat exchanger is heated with waste heat from the internal combustion engine, the holding vessel can be provided so as to surround the corresponding heater, or it is also contemplated, given a suitable configuration, for the heater to be integrated in the holding vessel. In the latter case, the evaporation of the ammonia stored in liquid form in the pressure vessel is controlled via a controlled introduction of heat. Furthermore, with a view to making the temperature of the pressure vessel or its filling more uniform when the internal combustion engine is not operating, the holding vessel offers favorable conditions, in particular also with a view to maintaining a minimum temperature, if appropriate by heating.

To achieve a high degree of flexibility in terms of the heating power which can be applied, it may be expedient for a plurality of types of heating to be provided in combination, for example heating by use of the waste heat from the internal combustion engine from the cooling circuit and from the exhaust gas, and if appropriate also by use of an independent electrical heater. In particular, for the introduction of heat from the exhaust gas, the heat transfer can also be effected via heat pipes, especially as these offer favorable heat transfer conditions with regard to defining limit temperatures.

If the holding vessel is, as is preferred, configured to be substantially gastight, and if appropriate also insulating, it may be expedient for it to be assigned a vessel opening which opens to atmosphere and can be blocked off and which may be controlled in particular as a function of temperature, even automatically, for example by thermocouples or bimetallic elements, in order, if necessary, to be able to combat excessive heating. Moreover, the holding vessel, in particular in its insulating configuration, may also form a safety vessel.

Within the context of the present invention, it may be expedient to operate with a plurality of pressure vessels, in particular in the form of exchangeable pressure vessels, which are preferably each arranged in holding vessels which can be heated independently, it being contemplated for these vessels to be combined to form a single unit. Dividing up the store of reducing agent which is carried in this way makes it possible to provide the reducing agent in units which are easy to handle and can be connected up separately or together, including, if appropriate, in terms of the heating. Thereby, rapid response can be achieved by the device even when little energy is being used and the overall storage volume is large.

To achieve priority heating of the filling of the pressure vessel(s) in braking and overrun mode of the associated internal combustion engine, it is further contemplated that the corresponding actuation takes place on the basis of information provided via the engine management system.

Exchangeable pressure vessels, in particular in cylinder form, which can be used in the context of the invention are preferably provided, in a known way, with a line-break safety feature and, downstream of the latter, a vessel valve. The vessel valve is expediently also surrounded by the housing of the metering unit, so that it is possible to carry out monitoring functions with regard to possible leaks, and if appropriate also malfunctions on the part of the metering unit, given suitable control technology links, and this includes monitoring functions with regard to the functions of the metering unit itself.

The metering unit which can be used in the context of the invention, but also in general terms where the reducing agent is introduced into the catalytic converter in gas form, has, despite its apposite, versatile functions, a simple structure. Starting from the vessel valve, in the direction of passage, the meter unit comprises a shut-off valve, a temporary store and a metering valve, with pressure recording provided on both sides of the metering valve, in particular by way of pressure sensors. It is deemed currently preferable for a temperature sensor to be arranged downstream of the pressure sensor which is mounted upstream of the metering valve and for its part lies downstream of the temporary store.

In particular, within the context of the present invention, it is also contemplated for the pressure difference occurring at the metering valve—as a throttle—to be utilized, on account of the evolution of heat which occurs correspondingly to the pressure drop, to replace one of the pressure sensors used as a pressure pick-up with a temperature pick-up, in accordance with the following law $$T_2 = T_1\left(\frac{p_2}{p_1}\right)^{\frac{K-1}{K}}$$

especially as the device according to the invention for exhaust-gas purification is in any event assigned an electronic evaluation and control unit which monitors the filling level of the pressure vessel(s) and controls the metering unit and monitors it for leaks and operating defects. Using a temperature pick-up instead of a pressure pick-up further simplifies and reduces the cost of the device.

With a view to monitoring leaks from the metering unit, according to the invention, it is deemed currently preferable for the housing of the metering unit also to be assigned a pressure sensor. Thereby, so that all the individual elements of the metering unit, for example in particular including the connected lines, can be monitored for any leaks to atmosphere.

Irrespective of a supply of gaseous ammonia via the pressure vessel, which is preferably controlled as a function of the operating conditions of the internal combustion engine, it is impossible to avoid pressure fluctuations which, by acting on the metering valve, would adversely affect operation of the latter. According to the present invention, these fluctuations can be compensated for by the temporary store interacting with the shut-off valves. In addition, the temporary store also gives advantageous options with regard to the monitoring and functional testing of the system.

BRIEF DESCRIPTION OF THE DRAWINGS

Other objects, advantages and novel features of the present invention will become apparent from the following detailed description of the invention when considered in conjunction with the accompanying drawings.

The sole figure schematically shows an embodiment of the present invention in which an internal combustion engine in particular a diesel internal combustion engine is used as the drive source of a motor vehicle, and is assigned a control unit via which the engine functions are controlled in a known way as a function of characteristic variables recorded at the vehicle and/or at the engine.

DETAILED DESCRIPTION OF THE DRAWING

To discharge the exhaust gases, an internal, combustion engine 1 is assigned an exhaust section 3, in which there is what is known as an SCR catalytic converter 4 for reducing the nitrogen oxides with are present in the exhaust gases. The catalytic converter 4 is acted on by gaseous ammonia as reducing agent. The supply of gaseous ammonia to the catalytic converter 4 is metered via a metering line 5, which in the diagrammatic illustration opens out into the exhaust section 3 upstream of the catalytic converter 4.

The metering line 5 is located in a transition to a metering unit 6, in which the ammonia, which is initially in liquid form in a pressure vessel 7, after a suitable proportion has been converted into the gaseous state by heating, is metered in accordance with the prevailing exhaust-gas conditions, which are dependent on the operating conditions of the internal combustion engine 1. For this purpose, the metering unit 6 is assigned an evaluation and control unit 8, in which relevant data relating to the exhaust-gas purification device, which is denoted generally by numeral 9, are linked to operating data of the internal combustion engine, recorded by a control unit 2, and are converted into control commands for the metering unit 6 and, if necessary, for the heating of the pressure vessel 7 and/or its filling.

In addition, the evaluation and control unit 8 allows actuation of the elements of the metering unit 6 such that the device 9, in particular the metering unit 6, can be checked in terms of its functions and also as to whether there are any links which could have an adverse effect on the functional reliability and operating safety of the device 9. The sole FIGURE only indicates the contours of the catalytic converter 4, because its structure corresponds to known embodiments.

The illustration of the pressure vessel 7 is also only shown schematically, from which it can be seen that the pressure vessel 7, for example a conventional pressurized cylinder, is arranged inside a holding vessel 10, which surrounds the pressure vessel 7, preferably in a pressure-tight manner. It is also contemplated that the holding vessel 10 form an insulating and/or heating casing which, if appropriate, is responsible for heat exchanger functions or is assigned heat-conducting devices which allow the pressure vessel 7 to be heated by externally supplied heat.

In this context, it is contemplated, for example, as indicated by the arrow 11, for exhaust-gas heat to be used to heat the pressure vessel 7 and/or its filling or contents, it being possible for heat transfer to be effected, for example, from the exhaust section 3 to the pressure vessel 7 via heat pipes which pass through the holding vessel 10. It is also contemplated for the heating to be carried out by heater coils which are assigned to the holding vessel 10 and for their part (not shown) are supplied from the cooling-water circuit of the internal combustion engine 1.

Furthermore, it is possible, by way of example, for electrical heater coils to be arranged as radiant heaters within the holding vessel 10 or to provide an inductive heater and therefore for heating devices (not shown) to be actuated with a view to maintaining limit temperatures and/or currently desired heating temperatures, if appropriate as a function of other parameters, by way of the evaluation and control unit 8. For example, in the case of electrical heating, this heating can be switched on and off or its heating power be controlled appropriately, or, heating from the cooling circuit, to influence the quantity of cooling water flowing through.

Depending on its particular configuration, the holding vessel 10 may also be configured as a double shell with respect to the pressure vessel 7, irrespective of the functions which have been discussed above. Thereby, an additional safety feature for the pressure vessel 7 can be produced, in combination, for example, with monitoring of the pressure vessel 7 for possible leaks via sensors which respond to the corresponding substance of the filling of the pressure vessel, in the exemplary embodiment ammonia, and for their part are in turn linked to the evaluation and/or control unit 8, so that corresponding warning signals can be triggered.

This is also contemplated with a view toward temperature monitoring of the pressure vessel 7 with the embodiment shown also offering the option, with regard to the holding vessel 10, of assigning the pressure vessel 7, for example, a connection to atmosphere which is controlled as a function of temperature, as indicated by numeral 12. The reference numeral 13 indicates that the pressure vessel 7 is provided on the outlet side with a line-break safety feature which, in a similar way to known line-break safety features used in the domestic sector, responds when a quantity of gas which is greater than the maximum discharge quantity required in operation flows out.

The line-break safety feature 13 is adjoined by the vessel valve 14, which is likewise only schematically shown and by way of which the connection between pressure vessel 7 and metering unit 6 is produced. The vessel valve 14 has its connection part to the pressure vessel 7 or an associated connection stub located within the housing 15 of the metering unit 6, so that a substantially gastight holder for connections, screw joints and attachment device for the metering unit 6, which can be continuously monitored for any leaks, is created by the housing 15, (which is indicated schematically by dot-dashed lines.) For this purpose, the housing 15, is assigned a pressure sensor 16.

The metering unit 6 furthermore comprises, in succession in the following order downstream in the direction of the exhaust section, a shut-off valve 17, a temporary store 18, a first pressure sensor 19, a temperature sensor 20, a metering valve 21 and a second pressure sensor 22. Shut-off valve 17 and metering valve 21 are controlled, in particular magnetically actuated valves which are actuated by the evaluation and control unit 8. The sensors 19, 20 and 22 are also connected in a corresponding way to the evaluation and control unit 8.

When the vessel valve 14 and shut-off valve 17 are open, the temporary store 18 is filled with gaseous ammonia in accordance with the filling of the pressure vessel 7 with ammonia, and the quantity of gas which has in each case been predetermined by the evaluation and control unit 8 and is fed to the exhaust section 3 via the metering line 5, is metered in via the metering valve 21. The sensors 19, and 22 are used for pressure monitoring, allowing the volumetric flow to be controlled in accordance with the resulting pressure drop and also allowing a corrective adjustment to the volumetric flow as a result of feedback to the metering valve 21.

The conditions for a relatively low, uniform application of pressure to the metering valve 21, which is matched to the function of the metering valve 21, are ensured by the temporary store 18 as a result of the temporary store 18 alternately being filled with gaseous ammonia when the shut-off valve 17 is open and the metering valve 21 is closed. Then, when the shut-off valve 17 is closed, emptying to the metering line 5 or into the exhaust section 3 can take place within relatively tight pressure limits via the metering valve 21, until a certain minimum pressure has been reached. Thereupon, the temporary store 18 is filled again.

If operation of the vehicle ceases as a result of the internal combustion engine 1 being turned off, it is preferable for the temporary store 18 likewise to be emptied via the metering valve 21 to the exhaust section 3. For subsequent restarting of the internal combustion engine 1, there is therefore an accumulation of ammonia in the catalytic converter 4, allowing the latter to respond rapidly even in situations in which, on account of the ambient temperatures, a certain run-up time for the heater is required before gaseous ammonia can be produced, unless, in conjunction with the insulating configuration of the holding vessel 10, the latter is held, even for a limited time, at a certain minimum temperature, which is likewise contemplate within the scope of the invention.

The exemplary embodiment illustrates just one pressure vessel 7 arranged in a holding vessel 10. As an alternative, it is also contemplated for a plurality of pressure vessels 7 to be provided in a similar arrangement and configuration. The pressure vessels can be connected to the metering unit 6 individually or in combination, parallel connection to the metering unit 6 expediently being provided with a view to making the cylinders suitably exchangeable. Thereby, the pressure vessels 7 can be changed even during operation. The use of a plurality of pressure vessels 7 arranged individually or together in one or more holding vessels 10 also makes it possible to use the pressure vessels 7 alternately to feed the catalytic converter, in order, for example, to be able to compensate for temperature-related fluctuations in the production of gas of the individual pressure vessel 7 by in each case connecting up another pressure vessel.

Despite the simple structure of the metering unit 6, it offers extensive possibilities for leak detection and monitoring of its elements with regard to their functions, for example with regard to functional monitoring of the sensors and checking the seal of the valves. The corresponding test sequences can be initiated and carried out automatically, at predetermined time intervals, by the evaluation and control unit 8 and corresponding malfunctions can be recorded, indicated and limited in terms of any damaging effects which they may have by switching off or switching over to emergency operation.

It has already been noted that leaks inside the metering unit 6 as a whole can be recorded by the pressure sensor 16, which may to this end also be replaced by a sensor means which records the corresponding concentration of ammonia. Furthermore, it is within the scope of the present invention to use a test sequence which detects leaks between vessel valve 14, including leaks from the valve 14 and from the valve connection, and shut-off valve 17 by closing the shut-off valve 17 when the vessel valve 14 is open and using the sensor 16 to monitor the pressure within the housing 15 to observe whether a limit value is exceeded. A corresponding option consists in recording the time-dependent changes in the pressure.

If a leak is detected, when appropriately confirmed by the time-dependent monitoring, the vessel valve 14 is closed and the shut-off valve 17 and the metering valve 21 are preferably opened, in order to remove gas from the unit and to use the residual gas for the reduction. In a corresponding way, leaks can be detected between shut-off valve 17 and metering valve 21, specifically, when the above-mentioned valves are closed and the temporary store 18 is filled, by the pressure sensor 19 which lies in this region or also by recording pressure changes in the interior of the housing 15 by the sensor 16.

A simplified sequence for recording the entire section between vessel valve 14 and metering valve 21 checking the entire section and localizing the check in the manner described above only if a leak is detected.

Finally, leaks can be detected downstream of the metering valve 21, including the region of the metering line 5, all the way into the exhaust section 3, or a break in the metering line 5, specifically by the pressure recorded by the pressure sensor 22 located downstream of the metering valve 21. If this pressure is virtually constant when the metering valve 21 is closed and is not correlated with the exhaust-gas back pressure measured in the exhaust section 3 upstream of the catalytic converter 4, this is a clear indication of a corresponding fault. As a result, the shut-off valve 17 or the vessel valve 14 needs to be closed and a corresponding warning message needs to be signaled.

Therefore, within the scope of the present invention, the leaktightness of the device 9 can be monitored with little outlay and virtually continuously, and therefore high operational reliability can be ensured, especially since corresponding irregularities can be recorded and processed using the diagnosis systems which are in any case present in vehicles. The monitoring reliability in this respect can be improved still further by the holding vessel 10 together with the pressure vessel 7 and the metering unit 6 as a whole being arranged within a substantially gastight and preferably also protective enclosure which, as has been outlined above, may if appropriate be included in the sensor monitoring system.

In addition to the leak monitoring, it is also within the scope of the invention to monitor the functions of the sensors used, in particular as part of a plausibility check. For example, the pressure sensor 19 located between temporary store 18 and metering valve 21 can be checked by observing the correlation in the pressure rise during filling of the temporary store 18, specifically by comparison with a pressure curve stored in the evaluation and control unit 8.

With regard to the second pressure sensor 22, which is located downstream of the metering valve 21, a functional check is made possible by the fact that, when the metering valve 21 is closed, the pressure $p_2$ indicated via the pressure sensor 22 is compared with the exhaust-gas back pressure which is recorded on the engine side and is measured upstream of the catalytic converter 4. If no pressure compensation is established within a predetermined time, there is a malfunction. The malfunctions are indicated and, in the event of a malfunction in the pressure sensor 19 located upstream of the metering valve 21, it is also recommended to close the shut-off valve 17, because the pressure-compensating function of the temporary store is otherwise not ensured.

Furthermore, it is also within the scope of the present invention to monitor the metering valve 21 and the shut-off valve 17 to establish whether they are leaktight. For this purpose, in a similar way to the detection of any leaks between shut-off valve 17 and metering valve 21, the leaktightness of metering valve 21 and shut-off valve 17 can be checked by observing the pressure as a function of time, with the temporary store 18 filled. If a pressure deviation which can be detected as a fault is recorded, the test operation can be repeated with the shut-off valve 17 open and the vessel valve 14 closed, so that the fault must be at the metering valve 21 if a relevant pressure deviation is found once again. In a similar manner, the leaktightness of the vessel valve 14 can be checked and monitored, even if a plurality of pressure vessels 7 are used in an alternating-cylinder concept.

Therefore, the present invention provides a device 9 and method for exhaust-gas purification involving reduction of nitrogen oxides which are present in the exhaust gas from internal combustion engines 1 by gaseous ammonia using an SCR catalytic converter 4. The present invention is distinguished by a simple structure, good control options and a very extensive and simple monitoring concept, in which the functions of the device 9 are monitored with regard to their line paths with connections, valves and sensors by referring to these elements themselves using suitable control circuitry via the evaluation and control unit 8.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for exhaust-gas purification involving reduction of nitrogen oxides, which are present in the exhaust gas from internal combustion engines, comprising an SCR catalytic converter using ammonia, at least one pressure vessel having a filling which releases gaseous ammonia when heat is supplied, and a metering unit downstream of the pressure vessel in a transition to the SCR catalytic converter, which metering unit is an ammonia source, wherein the pressure vessel filling is liquid ammonia, and at least the metering unit is arranged in a gastight, pressure-monitored housing.

2. The device as claimed in one claim 1, wherein a heater is arranged at least one of detachably and separately with respect to the pressure vessel.

3. The device as claimed in claim 1, wherein the pressure vessel is exchangeable.

4. The device as claimed in claim 1, wherein a heat exchanger, which is configured to be fed with waste heat from an internal combustion engine, is operatively associated with the vessel.

5. The device as claimed in claim 4, wherein the heat exchanger is heated from a cooling circuit of the internal combustion engine.

6. The device as claimed in claim 5, wherein the heat exchanger is connected to the cooling circuit of the internal combustion engine.

7. The device as claimed in claim 4, wherein the heat exchanger is heated by exhaust gas from the internal combustion engine.

8. The device as claimed in claim 7, wherein the heat exchanger is heated by at least one of heat conduction and heat radiation.

9. The device as claimed in claim 4, wherein the heat exchanger is a heat pipe.

10. The device as claimed in claim 4, wherein a predetermined limit temperature of the pressure filling limits heating capacity which is introduced.

11. The device as claimed in claim 1, wherein the pressure vessel is operatively associated with an electrical heater.

12. The device as claimed in claim 11, wherein the pressure vessel is heated by heating elements which lie at least one of inside and outside thereof.

13. The device as claimed in claim 11, wherein the pressure vessel is heated by a radiant heater.

14. The device as claimed in claim 11, wherein an inductive heater is provided for the pressure vessel filling.

15. The device as claimed in claim 1, wherein the pressure vessel is operatively associated with a holding vessel.

16. The device as claimed in claim 15, wherein the holding vessel is a heat exchanger.

17. The device as claimed in claim 15, wherein the holding vessel is of gastight construction.

18. The device as claimed in claim 15, wherein the holding vessel is of insulated construction.

19. The device as claimed in claim 15, wherein the holding vessel has a vessel opening which is selectively openable to atmosphere and to be blocked off.

20. The device as claimed in claim 1, wherein the at lease one pressure vessel consists of a plurality of pressure vessels.

21. The device as claimed in claim 20, wherein the pressure vessels are each operatively arranged in a holding vessel.

22. The device as claimed in claim 20, wherein the pressure vessels are arranged operatively in a common holding vessel.

23. The device as claimed in claim 20, wherein the pressure vessels are jointly operatively connected to the metering unit.

24. The device as claimed in claim 20, wherein the pressure vessels are separately operatively connected to the metering unit.

25. The device as claimed in claim 20, wherein the pressure vessels are switchably operatively connected to the metering unit.

26. The device as claimed in claim 1, wherein the pressure vessel is operatively associated with a line-break safety device and, downstream of the latter, a vessel valve.

27. The device as claimed in claim 26, wherein the metering unit and the vessel valve arranged on an outlet side of the pressure vessel, are located in the metering unit.

28. The device as claimed in claim 1, wherein the metering unit is operatively connected downstream of the pressure vessel in a direction of the catalytic converter and comprising, in a direction of passage, a shut-off valve, a temporary store and a metering valve, having pressure recording provided on both sides thereof.

29. The device as claimed in claim 28, wherein a pressure sensor for pressure recording is provided on sides of the metering valve.

30. The device as claimed in claim 28, wherein a temperature sensor is provided between the temporary store and the metering valve.

31. The device as claimed in claim 30, wherein the temperature sensor is arranged downstream of the pressure sensor which is mounted upstream of the metering valve.

32. The device as claimed in claim 28, wherein a temperature sensor is arranged on both sides of the metering valve.

33. The device as claimed in claim 28, wherein the shut-off valve and metering valve are as controllable valves.

34. A method for operating a device for exhaust-gas purification involving reduction of nitrogen oxides which are present in the exhaust gas from a motor vehicle internal combustion engine, having an SOR catalytic converter using ammonia, at least one pressure vessel having a filling which releases gaseous ammonia when heat is supplied, a metering unit located downstream of a the pressure in a transition to the SCR catalytic converter and a temporary store (18) located between a shut-off valve and a metering valve, comprising alternatively filling the temporary store in a pressure-limited manner, from the pressure vessel when the metering valve is closed and then emptying the temporary store via the metering valve down to a minimum pressure when the shut-off valve is closed, wherein when the internal combustion engine is being switched off, the temporary store is emptied to a exhaust section of the internal combustion engine.

35. The method as claimed in claim 34, wherein the exhaust section includes said SCR catalytic converter.

36. A method for monitoring a device for exhaust-gas purification involving reduction of nitrogen oxides which are present in exhaust gas from a motor vehicle internal combustion engine, wherein the device has an SCR catalytic converter using ammonia, at least one pressure vessel having a filling which releases gaseous ammonia when heat is supplied, and a metering unit downstream of the pressure vessel in a transition to the SCR catalytic converter, which metering unit is an ammonia source, wherein the pressure vessel filling is liquid ammonia, and at least the metering unit is arranged in a gastight, pressure-monitored housing, comprising processing pressure values obtained from a pressure recording in the metering unit, and a housing which surrounds the metering unit in an evaluation and control unit and converting the processed pressure values into control signals for at least one of valves, heater and warning signals.

37. The method as claimed in claim 36, wherein, in the event of a limit pressure being exceeded in a space surrounded by the housing and holding a vessel valve, a shut-off valve and the metering valve, the vessel valve is closed and, if the pressure limit continues to be exceeded, a line-pressure safety feature is activated.

38. The method as claimed in claim 36, wherein, to check for leaks in a metering line leads from a metering valve to an exhaust section of the internal combustion engine, exhaust-gas back pressure on a side of the internal combustion engine is compared with a pressure on the a side of metering valve.

39. The method as claimed in claim 38, further comprising to check sealing the metering valve, filling the temporary store between shut-off valve and metering valve, and checking that the pressure remains constant when the valves are closed.

40. The method as claimed in claim 38, further comprising, to test a pressure sensor located upstream of a metering valve, observing a pressure curve of the pressure sensor during filling of the temporary store for correlation with a pressure curve stored in the evaluation and control unit.

41. The method as claimed in claim 38, wherein the pressure on the metering valve side is recorded by a pressure sensor arranged downstream of the metering valve.

42. The method as claimed in claim 41, wherein, to check correctness of the pressure determined by the pressure recording arranged downstream of the metering valve, the determined pressure is compared with the exhaust-gas back pressure when the metering valve is closed.

43. The method as claimed in claim 41, further comprising, in the event of a fault, at least one of closing the pressure valve and emitting a warning signal.

* * * * *